United States Patent [19]
Bohner

[11] Patent Number: 5,330,060
[45] Date of Patent: Jul. 19, 1994

[54] SHELF AND TRANSPORTATION SYSTEM, IN PARTICULAR FOR GASTRONOMIC PURPOSES

[76] Inventor: Hubert Bohner, Dellenhag 8, 7967 Bad Waldsee-Gaisbeuren, Fed. Rep. of Germany

[21] Appl. No.: 40,353
[22] PCT Filed: Oct. 3, 1991
[86] PCT No.: PCT/DE91/00779
  § 371 Date: Mar. 30, 1993
  § 102(e) Date: Mar. 30, 1993
[87] PCT Pub. No.: WO92/05723
  PCT Pub. Date: Apr. 16, 1992

[30] Foreign Application Priority Data
Oct. 4, 1990 [DE] Fed. Rep. of Germany ....... 4031308
Mar. 15, 1991 [DE] Fed. Rep. of Germany ....... 4108356

[51] Int. Cl.$^5$ ................................. A47F 7/00
[52] U.S. Cl. ..................... 211/41; 211/133; 280/79.3
[58] Field of Search ............ 211/41, 71, 133, 186, 211/189; 280/79.3

[56] References Cited

U.S. PATENT DOCUMENTS

| | | | |
|---|---|---|---|
| 563,562 | 7/1896 | Burns | 211/71 |
| 588,440 | 8/1897 | Jones | 211/71 X |
| 1,211,269 | 1/1917 | Abbott | 211/71 X |
| 2,420,940 | 5/1947 | Eldridge | 211/71 |
| 4,004,819 | 1/1977 | Brongo | 280/79.3 |
| 4,911,308 | 3/1990 | Nylund | 211/41 |
| 5,090,725 | 2/1992 | Feldner | 280/79.3 X |

FOREIGN PATENT DOCUMENTS

| | | |
|---|---|---|
| 0373127 | 6/1990 | European Pat. Off. . |
| 2613163 | 10/1977 | Fed. Rep. of Germany . |
| 8914138.5 | 3/1990 | Fed. Rep. of Germany . |
| 988858 | 9/1951 | France . |
| 2042216 | 2/1971 | France . |

*Primary Examiner*—Robert W. Gibson, Jr.
*Attorney, Agent, or Firm*—Spencer, Frank & Schneider

[57] ABSTRACT

Certain elements of a shelf and transportation system, in particular for gastronomic purposes, are described. Said system is based on a bearing structure with four vertical square columns (6) which are arranged in a square, onto which square columns different inserts (11) can be hooked, e.g. for plates (23). Said inserts (11) are frame structures with four feet and with retaining devices (10), for example in the form of horizontal rings. However, retaining devices for bottles, drinking glasses or other objects may also be mounted on the same frame structure. An expansion of the system consists in the fact that inserts are also provided which have horizontal bars seated at intervals above one another and serve in pairs as bearing shelves for trays or troughs. Furthermore, a wall holder is described, with the aid of which the inserts (11) can be hooked onto a wall in a sturdy manner.

13 Claims, 5 Drawing Sheets

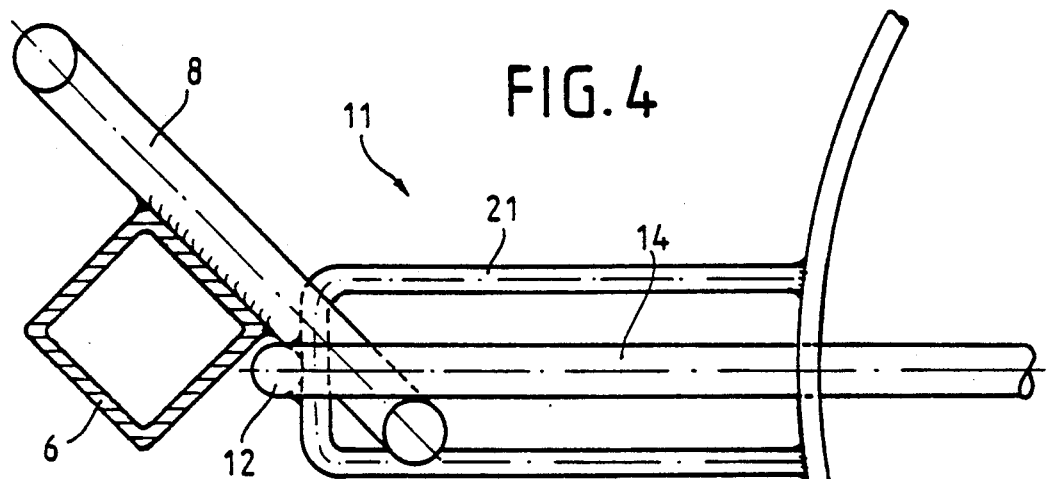
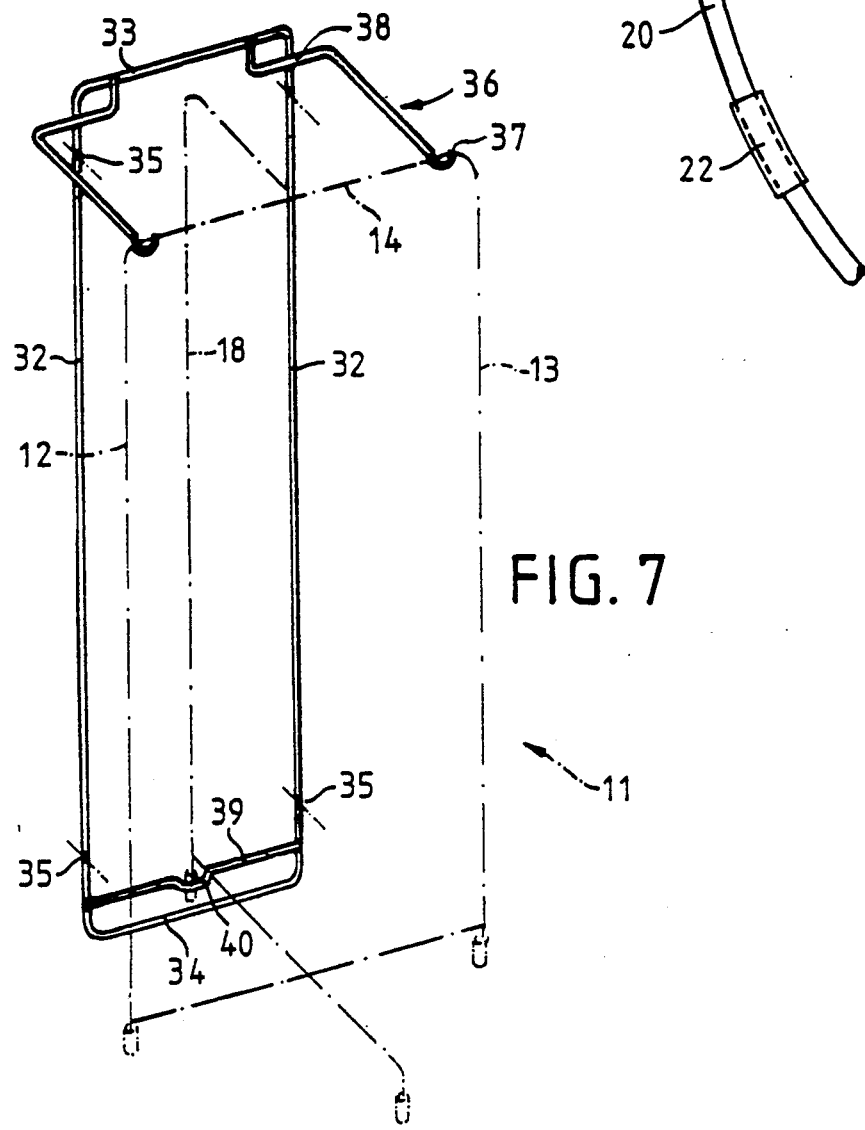

5,330,060

SHELF AND TRANSPORTATION SYSTEM, IN PARTICULAR FOR GASTRONOMIC PURPOSES

BACKGROUND OF THE INVENTION

The invention relates to a shelf and transportation system, in particular for gastronomic purposes, which comprises a mobile bearing structure including four vertical square columns which are arranged in a square, the columns having lateral surfaces which are parallel to the diagonals of the square and are connected to one another at the top and at the bottom. A transportable bearing structure, which is intended for plates and can be considered an important element of a system of this type, is known from U.S. Pat. No. 4,911,308. It serves for accommodating a multiplicity of plates which are arranged above one another resting on retaining members without contacting one another. Meals, in particular cold hors d'oeuvres, may be prepared on the plates. With the aid of a structure of this type for plates, the work surface in a large kitchen remains free. The prepared plates can be transported on the structure into a cooling area and later moved to a dining room for serving.

In the known bearing structure, the retaining members are fixedly attached to the square columns. The structure cannot be dismantled or used for other objects than plates of a particular size. Additionally, these plates can only be inserted into and removed from the bearing structure individually.

In order to prevent the deposited plates from rocking and slipping and dropping out of the fastener when jolted, e.g. when passing over a door threshold, the retaining members rise slightly away from the square columns. However, the oblique position of the plates thus caused has the disadvantage that the liquid constituents of the food prepared thereon run to one side. This inevitably leads to only plates with correspondingly solid food being deposited thereupon.

SUMMARY OF THE INVENTION

The underlying object of the invention is to provide a shelf and transportation system of the type described at the beginning which can be used in kitchen and serving operations in a variable manner and also for other objects, e.g. trays, bottles or glasses. The intention is to allow a joint loading and unloading of complete groups of such objects. Furthermore, the retaining devices for the individual plates are to be provided in such a way that they bring about a sturdy fastening of the latter, that the plates always assume a precisely horizontal position therein, and that, under these circumstances, the plates may have relatively large differences in shape and size.

The abovementioned object is achieved by the present invention, according to which a shelf and transportation system, in particular for gastronomic purposes, comprises a mobile bearing structure including four vertical square columns which are arranged in a square, the columns having lateral surfaces which are parallel to the diagonals of the square and are connected to one another at the top and at the bottom; a plurality of inserts which can be hooked onto the square columns and which have a plurality of retaining devices for objects which are to be deposited or transported, each of the inserts having a rectangular frame with horizontal and vertical legs the width of each frame corresponding approximately to the distance between two adjacent square columns of the bearing structure, and each frame being hooked in the region of its corners into hooks which are attached to the square columns. The inserts are individual structures for accommodating plates or other objects, it being possible for eight inserts, for example, to be hooked onto the bearing structure. Thus it is possible to fit the bearing structure itself, depending on requirements, with other inserts, even with several different inserts, and thus to use it for transporting or depositing the different objects. The depositing and transportation of trays is also important, two corresponding inserts, which have been hooked onto the bearing structure in each case, interacting as bearers for several trays carrying crockery. The inserts may be constructed as self-supporting individual structures and may additionally be designed to be hooked onto the wall with the aid of special wall fasteners, which has the advantage that they can be loaded and unloaded outside the bearing structure, i.e. they can also be used independently. Consequently, the elements according to the invention which are explained in greater detail below form an exceptionally variable shelf and transportation system for gastronomic operations.

The inserts preferably have in each case a rectangular frame with horizontal and vertical legs, the width of which frame approximately corresponds to the distance between two adjacent square columns of the bearing structure and which frame can be hooked in the region of its corners into hooks which are attached to the square columns. Bars, bent in a U-shape, are expediently provided as hooks which are mounted with their web on the surface facing the centre of each square column in such a way that the legs of the bars point upwards. Each bar thus forms a double hook which assists in bearing two adjacent inserts. In accordance with the intention to design the handling of the inserts as simply as possible, a secure and ergonomically favourable four-point hooking-in device for the inserts is thus provided which is additionally simple in terms of production.

In order to give the inserts for plates, glasses, bottles and the like the necessary stability and to provide the possibility for installing the corresponding retaining devices, it is proposed that the simple rectangular frame, which serves as hooking-on element, be expanded and provided with feet. Accordingly, provision is made for a bar part of right-angled U-shape to be seated perpendicular to the plane of the frame in the centre of the top and bottom horizontal leg of the frame, the web of which bar part forms a third vertical leg and the extended bottom horizontal leg of which bar part crosses the bottom leg of the frame, feet being mounted on the ends of these legs. The four feet may be provided with caps or other parts made of an elastic material for further improvement of stability.

Retaining devices for the individual objects can be mounted on the three vertical legs. For the particular use for plates, it is proposed that a plurality of plate holders in the form of horizontal circular rings be mounted in the insert at intervals above one another. The rings may be attached to the three vertical legs of the insert with the aid of in each case three supports projecting radially outwards. The plates rest on the rings all around, with the result that, on the one hand, their horizontal alignment and, on the other hand, their jolt-resistant and sturdy fastening are secured. Advantageously, plates of many different sizes can also be inserted in one ring, provided only that the diameter of the plate exceeds the diameter of the ring. Mufflers made of plastic, which largely prevent rattling noises during transportation, may be mounted at intervals on the rings.

In order to be able to mount trays or other trough-shaped containers, such as are customary in gastronomy, on the bearing structure, the trays may not be wider than the spacing of the square columns of the bearing structure so that they can be inserted between these columns. Special inserts which interact in pairs serve as a shelf for the trays. These inserts are constructed as rectangular frees which have horizontal bars seated on their vertical legs at intervals above one another and pointing to one side, on which bars the trays rest with their longitudinal edges. These inserts are hooked into opposite sides of the bearing structure in such a way that the bars face inwards, i.e. lie opposite one another. The bars have a straight horizontal central portion and leg portions which adjoin said central portion on both sides, point downwards, are bent with their end portions into the horizontal plane and are seated on the vertical legs of the insert.

Apart from trays, the bars can also accommodate deeper troughs which have edges bent downwards all around. The bars grip from below behind the bends of the longitudinal edges, while the bends of the transverse edges abut the bars because these troughs are only slightly longer than the bars. It is thus ensured that the troughs cannot slip out during transportation of the bearing structure.

The basic bearing shape in the form of a frame structure with three vertical legs arranged in a triangle, as was proposed above as a structure for plates, is best suited as an insert for drinking glasses and drink bottles. The bottles are best accommodated lying down and inclined obliquely inwards, while stemmed glasses can be suspended by the foot. However, it is also conceivable to incorporate a waste bin, a thermos container for hot food or any other object in such an insert, with the result that this special insert can be hooked onto the same bearing structure together with other inserts.

Finally, a wall holder is proposed which allows the described inserts for bottles and glasses, but in particular for plates, to be suspended without vibration. For this purpose, a three-point fastener is provided in such a way that, on the one hand, the top horizontal leg of the rectangular frame and, on the other hand, the rear foot of the insert are gripped. For this purpose, the holder has the form of a frame, from whose top part two bearing arms with hooks at their ends project forwards and whose bottom part has a loop, the hooks accommodating the top horizontal leg and the loop accommodating the rear foot of the insert. In particular, the holder may be a rectangular frame. The bearing arms should have attachment legs which are bent once in the plane of the frame in order to give them sufficient strength by simple welding-together at the crossing points of the wire portions. The loop may be formed by a horizontal transverse leg which is curved forwards. Wall fasteners of this type have the advantage that the inserts can be accommodated in a space-saving manner and the work surfaces in the kitchen remain free, although the inserts are readily available for the insertion and removal of objects.

All the inserts mentioned are preferably made of chromium-plated wire.

The proposed system constitutes an exceptionally variable aid, which can be adapted to meet the respective requirements, for large kitchen and gastronomic operations. On the one hand, the preparation, intermediate storage and serving of meals on plates in large quantities is simplified and accelerated. On the other hand, however, the system can also be of assistance when laying and clearing large tables.

However, it is also conceivable that the proposed shelf and transportation system is not limited to the sphere of gastronomy, but may also be applied for internal use in production factories if, for example, identical workpieces or other products have to undergo intermediate storage and be transported on from one processing point to another.

BRIEF DESCRIPTION OF THE DRAWINGS

An exemplary embodiment of the invention is described below with reference to the drawings, in which:

FIG. 4 shows an illustration of the detail IV in accordance with FIG. 2 on a larger scale, FIG. 7 shows a three-dimensional perspective view of a wall holder, for example for a plate insert according to FIG. 3.

DETAILED DESCRIPTION OF THE PREFERRED EMBODIMENT

Figure 1:
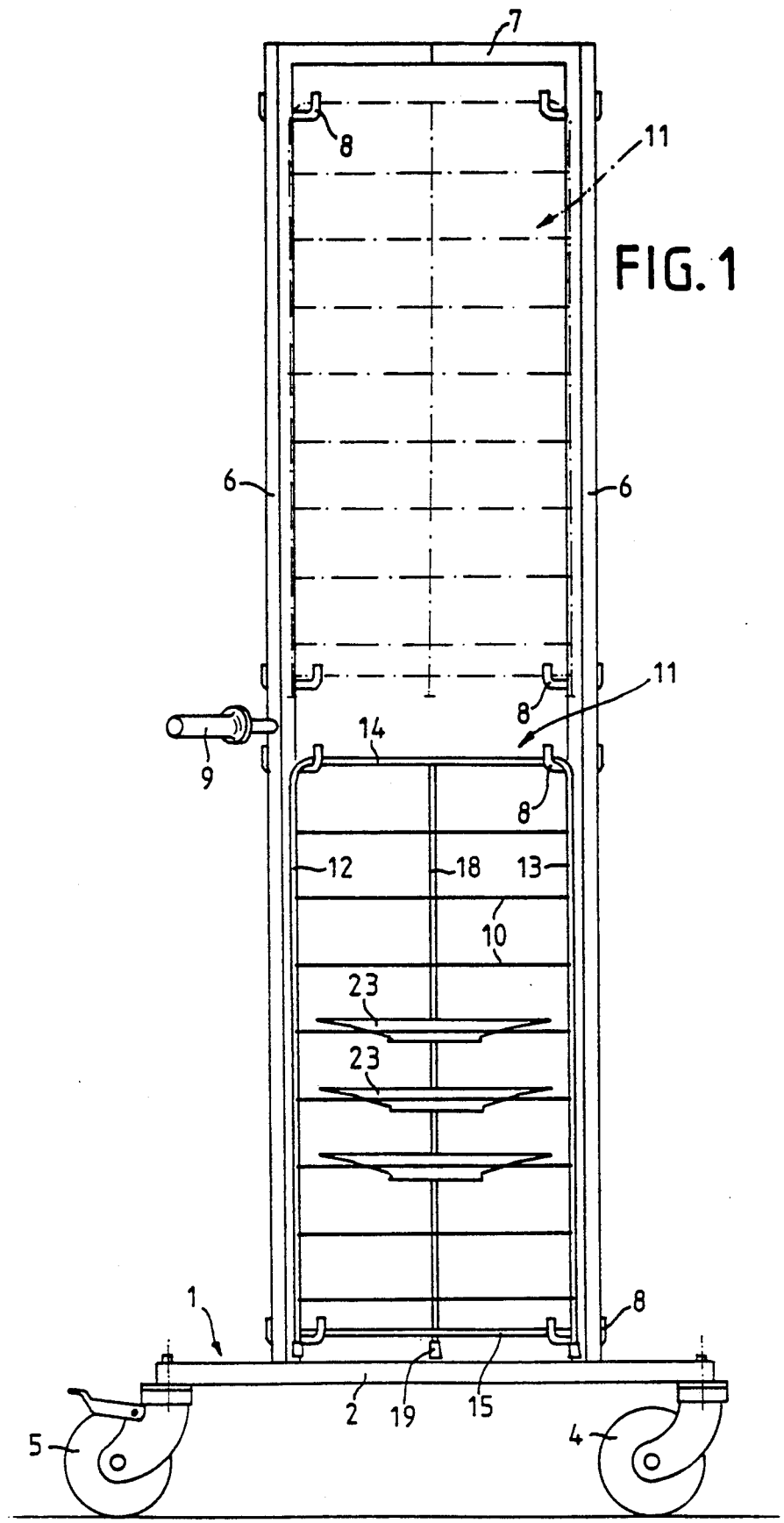
FIG. 1 shows a side elevational view of a transportable bearing structure, equipped with plate inserts.
Figure 2:
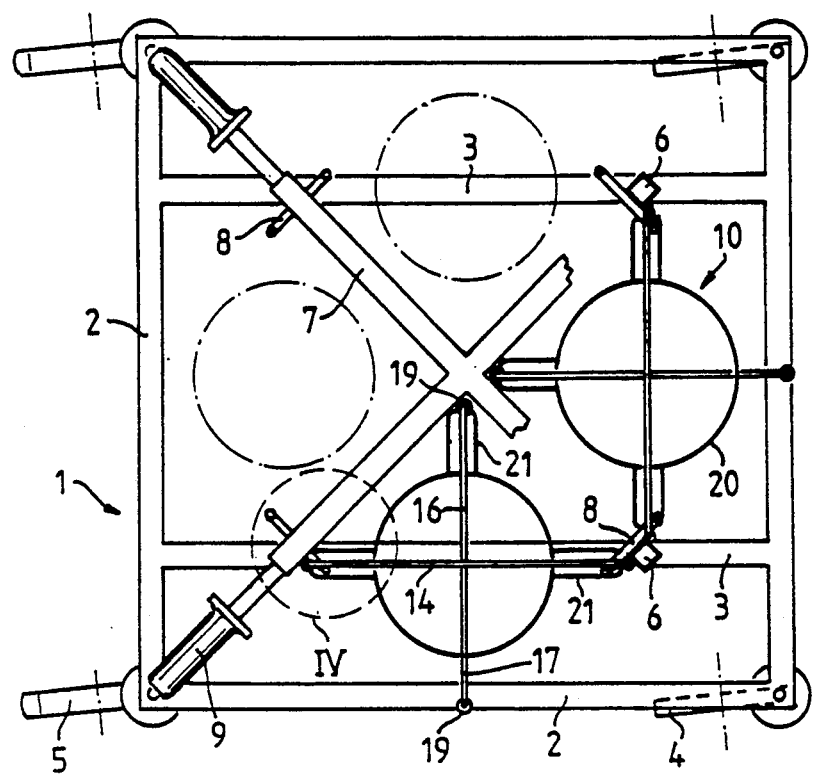
FIG. 2 shows a top plan view of the bearing structure according to FIG. 1.

The bearing structure according to FIG. 1 has a horizontal square basic frame 1 made of square tubing, consisting of four frame legs 2 and two parallel transverse struts 3. Four castors 4, 5 are mounted at the four corners of the basic frame 1. The two castors 5 can be braked.

Attached in a square outline arrangement on the transverse struts 3 are four square columns 6, the top ends of which are connected to one another by horizontal, crossing diagonal struts 7. The cross-sectional arrangement of the square columns 6 is such that their lateral surfaces run parallel to the diagonal struts 7, i.e. the inside surfaces of the square columns 6 lie diagonally opposite one another in pairs. Welded onto these inside surfaces are U-shaped bars 8 made of round steel and having legs pointing upwards. Each square column 6 bears four such bars, one at the bottom, one at the top and two in the central region. Finally, handles 9 are mounted on two square columns, namely on the side of the brakeable castors 5, with the aid of which handles the bearing structure can be pushed and steered. These handles 9 do not project beyond the basic frame 1.

Figure 3:
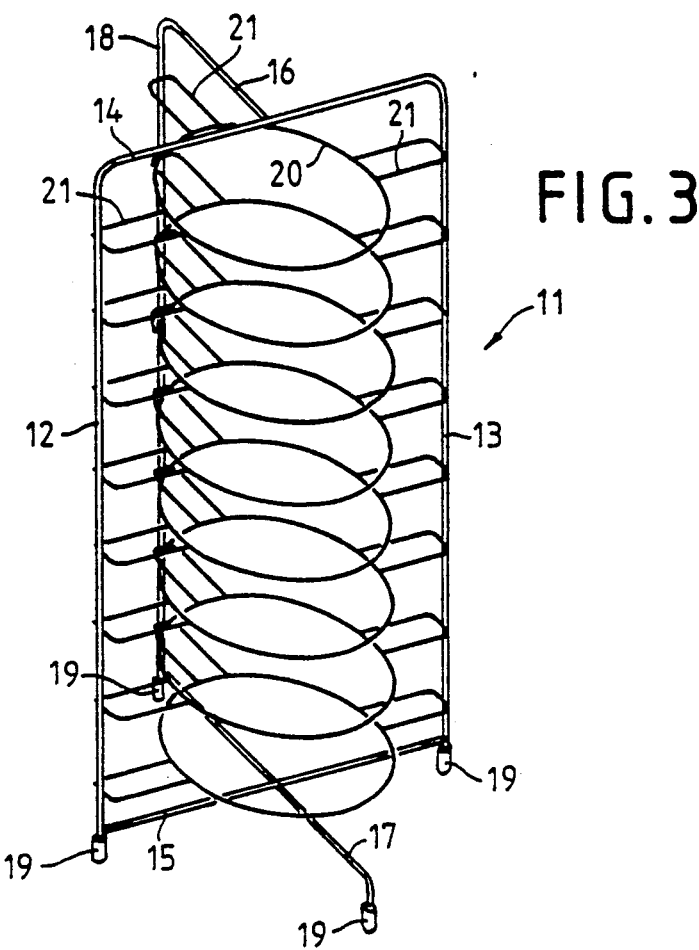
FIG. 3 shows a three-dimensional perspective view of one of the eight plate inserts of the bearing structure according to FIG. 1.

The insert 11 according to FIG. 3, which is made of chromium-plated steel wire, consists of a frame structure and eight retaining devices 10 for plates 23. The frame structure made of round wire with a diameter of about 8 mm comprises a rectangular frame made of vertical legs 12 and 13 and a top horizontal leg 14 and a bottom horizontal leg 15. The legs 12 to 14 are bent in a U-shape from one piece, the leg 15 is inserted. Attached perpendicular to the plane of this frame is a bar part, whose top horizontal leg 16 is seated approximately in the centre of the leg 14, while the longer bottom horizontal leg 17 crosses the leg 15 and is connected to the latter. The web of the bar part forms the third vertical leg 18 of the frame structure. The bottom ends of the three vertical legs 12, 13 and 18 project slightly beyond the bottom horizontal legs and form the feet of the frame structure, the free end, bent downwards, of the horizontal leg 17 forming the fourth foot. Rubber caps 19 are fitted onto the feet.

The retaining devices 10 of this example are made of round wire with a diameter of about 4 mm and consist of a circular ring 20 which is connected to the three vertical legs by means of three U-shaped supports 21. The U-shaped legs of the supports 21 are attached to the ring 20 so that the overall retaining device 10 forms one plane. All the connections of the individual parts described are welded as is customary in wire technology. The intervals between the horizontal retaining devices arranged above one another are about 8 cm in this example. The entire bearing structure is about 1.60 m high.

As shown in the illustrations according to FIG. 1 and FIG. 4, the inserts are hooked with their horizontal legs 14 and 15 over two of the bars 8 in each case and are thus fixed at the top and at the bottom. More precisely, this involves only half of each bar 8 which forms a right-angled hook with its relevant leg. In this case, the vertical legs 12 and 13 of the insert rest on the lateral surfaces of the square columns 6, by which means the hooking-in or insertion is facilitated. In total, the bearing structure is capable of accommodating eight inserts 11, two inserts being arranged one above the other in each case on the four sides. In FIG. 1, the bottom insert is illustrated fully and the top insert is indicated only by dot-dashed lines. The plates 23 are inserted in the rings 20, small clipped-on pieces of plastic hose 22 preventing the plates 23 from slipping and preventing any rattling.

The inserts, which can be simply pulled out by hand, as described, and are held in the central region of the top horizontal legs 14 and 16, can be set down anywhere with or without a plate deposited thereupon. If the retaining devices 10 are omitted, other retaining devices for bottles, glasses, etc., may be mounted on the remaining frame structures of the inserts 11. For example, a plastic bag with a spread-out opening may be inserted in the insert as a waste bin.

In the case of the plates being particularly large and possibly abutting one another with their edges, the bars 8 can be mounted on two opposite sides of the structure slightly higher or lower in relation to the other bars so that the inserts are also offset in terms of height.

Figure 5:
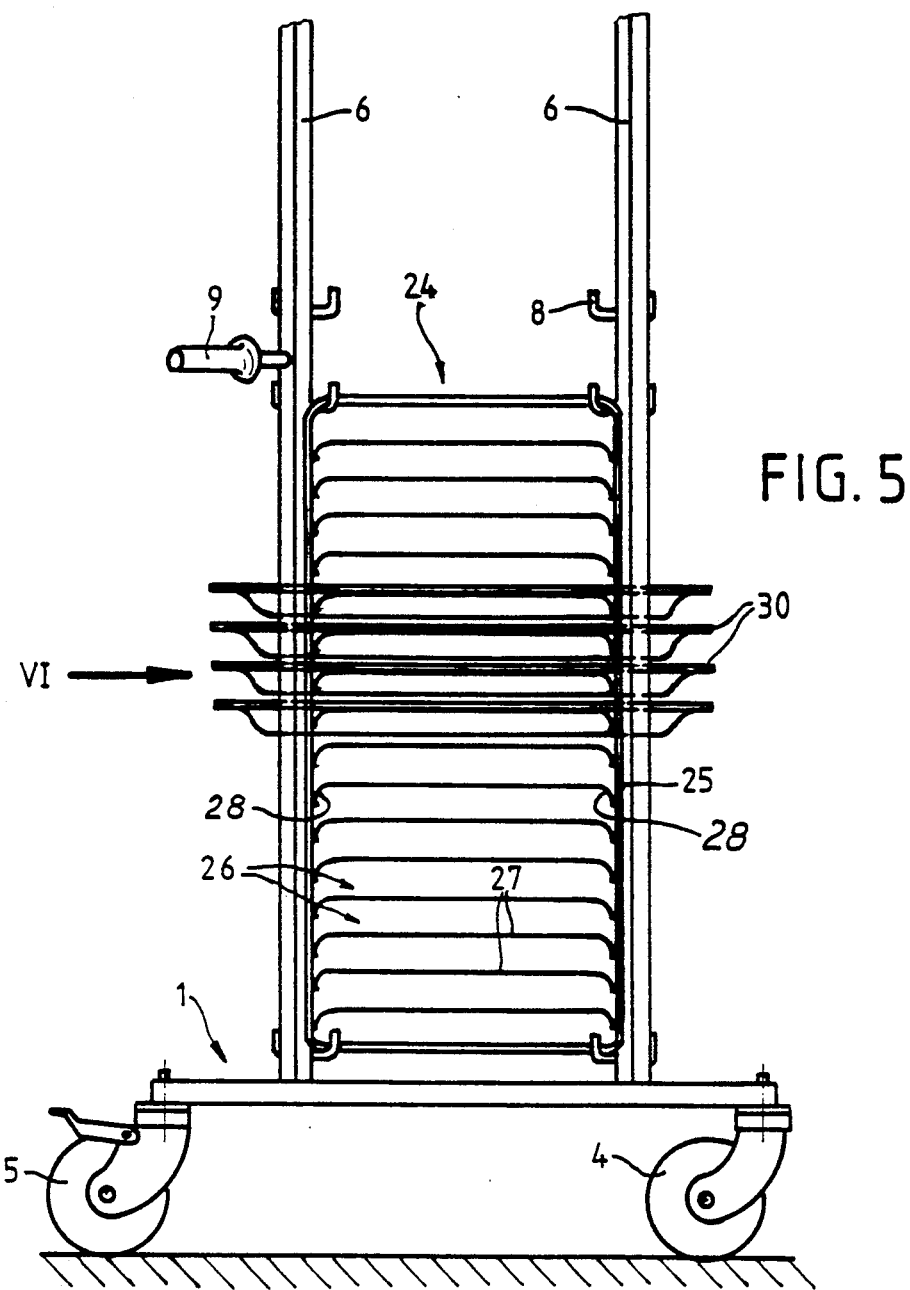
FIG. 5 shows a side elevation view of the bottom part of the transportable bearing structure; equipped in this case with tray inserts.
Figure 6:
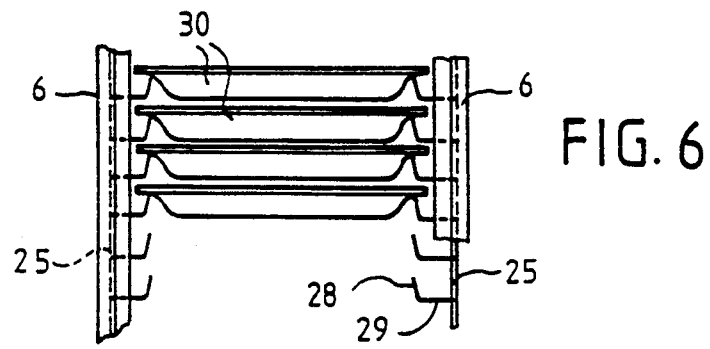
FIG. 6 shows a partial, side elevation view of the bearing structure according to FIG. 5 in the direction of the arrow VI.
Figure 8:
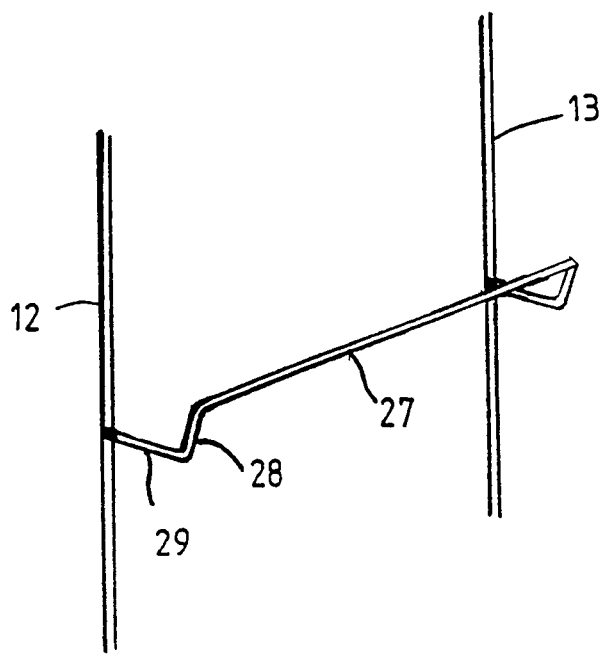
FIG. 8 shows a three-dimensional perspective view of a rail bar corresponding to the bearing structure according to FIGS. 5 and 6.

According to FIGS. 5, 6 and 8, an insert 24 is hooked onto two opposite sides of the same bearing structure, as illustrated in FIG. 1. Each of these inserts consists of a rectangular frame of the same dimensions as the frees 12, 14, 13, 15 according to FIG. 3 made of 8 mm round wire. Again the top and bottom horizontal transverse legs are gripped in each case by two hooks formed by the bars 8 so that the two vertical legs 25 are held in contact on the lateral surfaces of the corresponding square columns 6. Sixteen rail bars 26 made of a slightly thinner round wire are attached to each insert 24. They consist of a central portion 27, two adjoining oblique leg portions 28 and two parallel horizontal end portions 29 which are attached to the vertical legs 25 of the insert. The inserts 24 are hooked onto the bearing structure in such a way than the bars 26 face inwards. Thus the central portions 27 of two bars 26 located opposite one another at the same height form shelf rails, on which a tray 30, which fits between the square columns 6, can be placed with its longitudinal edges. This shape of the bars 26 allows insertion and removal of the trays 30 in a manner which is favourable to gripping, it being possible for sixteen of said trays to be accommodated in the bottom part of the bearing structure. By hooking on two further inserts 24, a further sixteen trays can be accommodated in the top part of the bearing structure, specifically even transversely to the bottom trays if desired.

The system described can be extended using various supplementary parts. Thus it is expedient, for example, to provide round trays having an edge, such as are used for serving beverages, and cake grids and flan plates with small feet or annular projections arranged on the underside in such a way that flat parts can be placed in the rings 20 of the inserts 11 without slipping. Further mentionable supplementary parts are cutlery and waste baskets which can be hooked onto the bars 26 of the inserts 24.

Finally, FIG. 7 shows a wall holder for the plate insert 11 described or other inserts which have the same free structures. The wall holder is conceived for this type of frame structure. It grips the insert 11, indicated by dot/dashed lines, at three points, namely on the top horizontal leg 14 in two places and on the rear foot. Thus the insert is held securely and without vibration.

The wall holder consists of a rectangular frame with two vertical longitudinal legs 32 and a top and bottom horizontal transverse leg 33 and 34 respectively. It can be screwed to the wall with the aid of two bores 35 in each longitudinal leg. Mounted in the region of the top corners of the rectangular frame are two horizontal bearing arms 36 projecting forwards, onto the free ends of which a hook 37 is moulded in each case. Furthermore, the hooks have attachment legs 38 which are bent twice at right angles and are arranged in mirror image in such a way that they once cross the longitudinal leg 32 and once cross the top transverse leg 33. The parts are connected to one another by welding at the crossing points. With slight spacing parallel to the bottom transverse leg 34 there is provided a further transverse leg 39 which has in the centre a curve 40 projecting forwards. It is here that the rear foot of the frame structure to be hooked in engages, while its top horizontal leg 14 lies in the hook 37.

All the parts described preferably consist of round steel with a diameter of 3, 5 or 8 mm. The surface may be chromium-plated, plastic-coated or protected in some other way from corrosion and adhering dirt. The fixed connection of the individual parts generally takes place by resistance welding, specifically preferably at the crossing points, as already mentioned.

I claim:

1. A shelf and transportation system, in particular for gastronomic purposes, said system comprising a mobile bearing structure including four vertical square columns which are arranged in a square, said columns having lateral surfaces which are parallel to the diagonals of the square and are connected to one another at the top and at the bottom; a plurality of inserts which can be hooked onto the square columns and which have a plurality of retaining devices for objects which are to be deposited or transported, each of said inserts having a rectangular frame with horizontal and vertical legs the width of each frame corresponding approximately to the distance between two adjacent square columns of the said bearing structure, and each frame being hooked in the region of its corners into hooks which are attached to said square columns.

2. The system according to claim 1, wherein a bar part of right-angled U-shaped is seated perpendicularly to the plane of said frame and in the center of the top and bottom horizontal legs of said frame, said bar part having a bar part web which forms a third vertical leg cooperating with said vertical legs of said frame to form the vertical legs of each of said inserts, said bar part further having an extended bottom horizontal leg which crosses the bottom horizontal leg of the frame, each of said inserts having feet being formed by the bottom ends of the vertical legs thereof, the bottom end of said third vertical leg thereby forming a rear foot for each of said inserts.

3. The system according to claim 2, wherein a plurality of retaining devices, intended for plates, in the form of horizontal circular rings are mounted on said inserts at intervals above one another.

4. The system according to claim 3, wherein said rings are attached to the three vertical legs of the insert with the aid of three supports projecting radially outwards.

5. The system according to claim 4, wherein said rings are provided with pieces of plastic hose for preventing the plates from slipping or rattling on said rings.

6. The system according to claim 1, wherein each of said inserts includes rail bars seated on vertical legs of each of said inserts at intervals above one another and pointing to one side of said frame, the mutually facing bars of two inserts which are hooked onto opposite sides of the bearing structure serving as shelf rails for trays.

7. The system according to claim 1, wherein fasteners for drink bottles and/or drinking glasses are mounted on the inserts.

8. The system according to claim 2, wherein a holder, which in intended for accommodating an insert and can be attached to a wall is in the form of a frame from whose top part two bearing arms with hooks at their ends project forward and whose bottom part has a loop, said hooks accommodating the top horizontal leg of the insert and the loop gripping the rear foot of the insert.

9. The system according to claim 8, wherein the holder has a rectangular frame, wherein the bearing arms have attachment legs which are bent once in the plane of the frame, and wherein the loop is formed by a transverse leg which is curved forwards.

10. The system according to claim 1, wherein said inserts are made of chromium-plated wire.

11. The system according to claim 8, wherein said holder is made of chromium-plated wire.

12. The system according to claim 1, wherein said hooks are formed by bars bent into a U-shape and mounted with their web on the surfaces facing the center of the said square columns in such a way that legs of said bars point upwards.

13. The system according to claim 6, wherein each of said rail bars includes a straight horizontal central portion, two oblique leg portions which adjoin said central portion on both sides thereof, and two parallel horizontal end portions which are seated on the vertical legs of each of said inserts.

* * * * *